United States Patent
Yeh

(10) Patent No.: US 12,104,233 B2
(45) Date of Patent: Oct. 1, 2024

(54) HIGH CHROMIUM AND SILICON-RICH CORROSION RESISTANT STEEL AND ARTICLE COMPRISING THE SAME

(71) Applicant: National Tsing Hua University, Hsinchu (TW)

(72) Inventor: Jien-Wei Yeh, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 0 days.

(21) Appl. No.: 17/396,763

(22) Filed: Aug. 9, 2021

(65) Prior Publication Data

US 2023/0051620 A1 Feb. 16, 2023

(30) Foreign Application Priority Data

Jul. 28, 2021 (TW) .................................. 110127675

(51) Int. Cl.
| | | |
|---|---|---|
| C22C 38/34 | (2006.01) | |
| C22C 38/04 | (2006.01) | |
| C22C 38/06 | (2006.01) | |
| C22C 38/20 | (2006.01) | |
| C22C 38/22 | (2006.01) | |
| C22C 38/24 | (2006.01) | |
| C22C 38/26 | (2006.01) | |
| C22C 38/28 | (2006.01) | |
| C22C 38/30 | (2006.01) | |
| C22C 38/32 | (2006.01) | |

(52) U.S. Cl.
CPC .............. *C22C 38/34* (2013.01); *C22C 38/04* (2013.01); *C22C 38/06* (2013.01); *C22C 38/20* (2013.01); *C22C 38/22* (2013.01); *C22C 38/24* (2013.01); *C22C 38/26* (2013.01); *C22C 38/28* (2013.01); *C22C 38/30* (2013.01); *C22C 38/32* (2013.01)

(58) Field of Classification Search
CPC .................................................... C22C 38/34
See application file for complete search history.

(56) References Cited

U.S. PATENT DOCUMENTS

| | | | | |
|---|---|---|---|---|
| 4,360,381 A | * | 11/1982 | Tarutani | .................. C22C 38/26 420/104 |
| 6,207,103 B1 | * | 3/2001 | Takajo | ..................... C22C 38/34 420/36 |
| 7,288,157 B2 | | 10/2007 | Kajinic et al. | |
| 7,914,732 B2 | * | 3/2011 | Takabayashi | ........... F01N 13/16 420/68 |

FOREIGN PATENT DOCUMENTS

| | | | | |
|---|---|---|---|---|
| EP | 0894874 | | 2/1999 | |
| JP | S51-128617 | | 11/1976 | |
| JP | H03-201415 | | 9/1991 | |
| JP | H09-041100 | | 2/1997 | |
| JP | H10110248 | | 4/1998 | |
| JP | H11286754 A | * | 10/1999 | ............. C22C 38/34 |
| JP | 2001-49399 | | 2/2001 | |
| JP | 2010-095768 | | 4/2010 | |
| JP | 2011-190470 | | 9/2011 | |
| JP | 2020111800 A | * | 7/2020 | |
| TW | 393518 | | 6/2000 | |

OTHER PUBLICATIONS

Search Report for Taiwan counterpart application TW110127675, date Jan. 17, 2022.
(English translation) Search Report for Taiwan counterpart application TW110127675, date Jan. 17, 2022.
Examination Report for Japan counterpart application JP2021-126792, date Sep. 20, 2022.
(English translation) Examination Report for Japan counterpart application JP2021-126792, date Sep. 20, 2022.

* cited by examiner

*Primary Examiner* — Jenny R Wu
(74) *Attorney, Agent, or Firm* — ANOVA LAW GROUP, PLLC

(57) ABSTRACT

A high chromium and silicon-rich corrosion resistant steel is disclosed, which comprises, in weight percent: 22-30% Cr, 2-10% Si, and the balance Fe and incidental impurities, of which a content amount of Cr and Si is less than 37%. Experimental data reveal that, samples of the high chromium and silicon-rich corrosion resistant steel all have a pitting potential greater than 0.8 V and a hardness in a range between HV170 and HV500 in the as-homogenized condition. As a result, experimental data have proved that the high chromium and silicon-rich corrosion resistant steel of the present invention can replace conventional stainless steels having poor pitting resistance like type 304 and type 316 L, and then be adopted for the applications of components and/or structural parts requiring high corrosion resistance.

3 Claims, No Drawings

HIGH CHROMIUM AND SILICON-RICH CORROSION RESISTANT STEEL AND ARTICLE COMPRISING THE SAME

BACKGROUND OF THE INVENTION

1. Field of the Invention

The present invention relates to the technology field of alloy materials and more particularly to a high chromium and silicon-rich corrosion resistant steel and article comprising the same.

2. Description of the Prior Art

In the last hundred years, various high chromium and low carbon stainless steels including nickel by a specific content were developed and applied in different industrial fields. Until now, there are more than 230 types of stainless steels purchasable on the market, of which about 50 types are used regularly, and they are further classified into 5 series of austenitic, martensitic, ferritic, precipitation hardening (PH), and duplex. Nowadays, articles made of stainless steel are found almost everywhere in people's daily life, from daily necessities (e.g., kitchenware and water towers), to industrial products (e.g., machine parts and aerospace components) and medical devices.

Governments today turn extensive financial and other resources to technological research of the special use stainless steels, and especially to the development and manufacture of austenitic stainless steels, martensitic stainless steels, and precipitation hardening (PH) stainless steels. As described in more detail below, austenitic stainless steels get the most widely used because of having good weldability, processability, and corrosion resistance. For example, type 316 L steel is one kind of austenitic stainless steel containing 18 wt % Cr, 8 wt % Ni, and 2-3 wt % Mo, wherein the Cr and Mo content increases corrosion resistance. Therefore, type 316 L steel shows a good corrosion resistance superior to that of type 304 steel. In spite of this, when a water pipe made of type 316 L steel is applied in a marine environment, it is unavoidable for the water pipe to be subject to crevice corrosion and pitting corrosion because the pitting potential of the type 316 L steel is commonly in a range between 0.3V and 0.6V. In other words, conventional type 304 steel and type 316 L steel both possess poor pitting corrosion resistance. On the other hand, engineers skilled in development and manufacture of stainless steels certainly know that, the type 304 steel and type 316 L steel both have the hardness less than HV 160 in the as-homogenized condition.

In summary, stainless steels get confined marine applications due to the fact that they must be subject to crevice corrosion and pitting corrosion by seawater. Therefore, how to develop and provide a novel alloy material possessing high corrosion resistance for applications in the manufacture of marine facility components, chemical equipment, and pipe fittings is hence becoming the most important topic. Herein, it needs to be particularly explained that, the foregoing components and/or parts are all structural articles, therefore this means that the newly-developed alloy material must have adequate hardness, fracture toughness, and corrosion resistance simultaneously. On the contrary, it is extrapolated that, alloy materials having the hardness greater than HV 500 in the as-homogenized condition are easily subject to rupture and/or peel crack during plastic deformation, thereby being apparently unsuitable for applications in the manufacture of the aforesaid structural articles.

According to above descriptions, it is understood that there are still rooms for improvement in the conventional stainless steels. In view of that, inventors of the present invention have made great efforts to make inventive research and eventually provided a high chromium and silicon-rich corrosion resistant steel.

SUMMARY OF THE INVENTION

The primary objective of the present invention is to disclose a high chromium and silicon-rich corrosion resistant steel, which comprises, in weight percent: 22-30% Cr, 2-10% Si, and the balance Fe and incidental impurities, of which a content amount of Cr and Si is less than 37%. Experimental data reveal that, samples of the high chromium and silicon-rich corrosion resistant steel all have a pitting potential greater than 0.8V and a hardness in a range between HV170 and HV500 in the as-homogenized condition. As a result, experimental data have proved that the high chromium and silicon-rich corrosion resistant steel of the present invention can replace conventional stainless steels having poor pitting resistance like type 304 and type 316 L, and then be adopted for the applications of components and/or structural parts requiring high corrosion resistance.

For achieving the primary objective, the present invention discloses a first embodiment of the high chromium and silicon-rich corrosion resistant steel, which has a pitting potential greater than 0.8V and a hardness in a range between HV170 and HV500, and comprises, in weight percent:

22-30% Cr;
2-10% Si; and
the balance Fe and incidental impurities, wherein an amount of Cr and Si is less than 37%.

In practicable embodiments, the first embodiment of the high chromium and silicon-rich corrosion resistant steel further comprises, in weight percent: up to 0.3% C and/or up to 0.2% B.

In practicable embodiments, the first embodiment of the high chromium and silicon-rich corrosion resistant steel further comprises, in weight percent:

up to 3% Mo and/or Nb; and
up to 2% M, wherein M comprises at least one additive element that is selected from a group consisting of Ni, Ti, Cu, V, Zr, Mn, Co, Ta, Sn, and Al.

To achieve the primary objective, the present invention also discloses a second embodiment of the high chromium and silicon-rich corrosion resistant steel, which has a pitting potential greater than 0.8V and a hardness in a range between HV170 and HV500, and comprises, in weight percent:

22-30% Cr;
2-10% Si;
up to 0.3% C;
up to 0.2% B;
up to 3% Mo and/or Nb;
up to 2% M; and
the balance Fe and incidental impurities;
wherein an amount of Cr and Si is less than 37%, and M comprising at least one additive element that is selected from a group consisting of Ni, Ti, Cu, V, Zr, Mn, Co, Ta, Sn, and Al.

In practicable embodiments, the high chromium and silicon-rich corrosion resistant steel can be produced by using a manufacturing method selected from a group consisting of: vacuum arc melting method, electric resistance wire heating method, electric induction heating method, rapidly solidification method, mechanical alloying method, and powder metallurgic method.

In practicable embodiments, the high chromium and silicon-rich corrosion resistant steel can be processed to be an article selected from a group consisting of powder, wire, welding rod, flux cored electrode, tube, plate, and bulk.

In practicable embodiments, the high chromium and silicon-rich corrosion resistant steel can be disposed on a surface of a work piece by using a process selected from a group consisting of casting process, electric-arc welding process, laser welding process, plasma-arc welding process, thermal spraying process, 3D additive manufacturing process, mechanical process, and chemical process.

In practicable embodiments, the high chromium and silicon-rich corrosion resistant steel can be processed to be in an as-cast state, or being in a heat-treated state after being applied with a heat treatment that is selected from a group consisting of precipitation hardening treatment, annealing treatment, and homogenization treatment.

In addition, the present invention also discloses a structural article, which is made of the high chromium and silicon-rich corrosion resistant steel according to the present invention, e.g., marine facility components, chemical equipment, and pipe fittings.

DETAILED DESCRIPTION OF THE PREFERRED EMBODIMENTS

To more clearly describe a high chromium and silicon-rich corrosion resistant steel and article comprising the same, embodiments of the present invention will be described in detail with reference to the attached drawings hereinafter.

First Embodiment

In the first embodiment, the high chromium and silicon-rich corrosion resistant steel has a pitting potential greater than 0.8V and a hardness in a range between HV170 and HV500, and comprises, in weight percent: 22-30% Cr, 2-10% Si, and the balance Fe and incidental impurities, of which an amount of Cr and Si is less than 37%.

Second Embodiment

In the second embodiment, the high chromium and silicon-rich corrosion resistant steel has a pitting potential greater than 0.8V and a hardness in a range between HV170 and HV500, and comprises, in weight percent: 22-30% Cr, 2-10% Si, up to 0.3% C, up to 0.2% B, up to 3% Mo and/or Nb, up to 2% M, and the balance Fe and incidental impurities. According to the present invention, an amount of Cr and Si is less than 37%, and M comprises at least one additive element that is selected from a group consisting of Ni, Ti, Cu, V, Zr, Mn, Co, Ta, Sn, and Al.

To realize corrosion resistance of the conventional stainless steels, the natural oxidation of Cr on the surface to form passivation films composed of oxides/hydroxides is an important factor. Therefore, the Cr content significantly affects the corrosion resistance of a stainless steel. According to those disclosed experimental data, a specific stainless steel is able to exhibit a well acid-resistant ability in case of its Cr content exceeding 13 wt %. In spite of this, when a structural article made of the foregoing specific stainless steel is applied in a marine environment, the passivation films of the structural article would still be subject to crevice corrosion and pitting corrosion. For this reason, the high chromium and silicon-rich corrosion resistant steel according to the present invention is designed to have high Cr content (22-30 wt %) and high Si content (2-10 wt %). Moreover, the high chromium and silicon-rich corrosion resistant steel is designed to further include at least one additive element by a specific content. As such, the high chromium and silicon-rich corrosion resistant steel according to the present invention has a pitting potential greater than 0.8V and a hardness in a range between HV170 and HV500.

When conducting the manufacture of the high chromium and silicon-rich corrosion resistant steel, it is allowable to produce the high chromium and silicon-rich corrosion resistant steel by using any one possible manufacturing method, for example, vacuum arc melting method, electric resistance wire heating method, electric induction heating method, rapidly solidification method, mechanical alloying method, and powder metallurgic method. Moreover, during the manufacture of the high chromium and silicon-rich corrosion resistant steel, it is also allowable to process the high chromium and silicon-rich corrosion resistant steel to be in an as-cast state, or to make the high chromium and silicon-rich corrosion resistant steel be in a heat-treated state by utilizing a heat treatment, such as precipitation hardening treatment, annealing treatment, and homogenization treatment. In other words, this high chromium and silicon-rich corrosion resistant steel can be processed to be different types of articles, e.g., powder, wire, welding rod, flux cored electrode, tube, plate, and bulk.

On the other hand, when implementing this high chromium and silicon-rich corrosion resistant steel, it is allowable to let the high chromium and silicon-rich corrosion resistant steel be disposed on a surface of a work piece by using a suitable process. The process can be casting process, electric-arc welding process, laser welding process, plasma-arc welding process, thermal spraying process, 3D additive manufacturing process, mechanical process, or chemical process.

Herein, it needs to be particularly mentioned that, the high chromium and silicon-rich corrosion resistant steel of the present invention is developed for replacing conventional stainless steels having poor pitting resistance like type 304 and type 316 L, thereby being adopted for the applications of components and/or structural parts requiring high corrosion resistance.

The inventor of the present invention has completed experiments in order to prove that the high chromium and silicon-rich corrosion resistant steel can indeed be made.

First Experiment

In the first experiment, 16 samples of the high chromium and silicon-rich corrosion resistant steel according to the present invention are fabricated by vacuum arc melting process. The following table (1) lists each sample's elemental composition. Moreover, homogenization process, hardness measurement, and pitting potential measurement for the 16 samples are also completed, of which an electrochemical test system comprising a potentiostat, a working electrode, a counter electrode, and a reference electrode is adopted for conducting the pitting potential measurement. When conducting the pitting potential measurement, a sample of the high chromium and silicon-rich corrosion resistant steel, a platinum electrode, and a calomel electrode are arranged to be the working electrode, the counter electrode, and the reference electrode of the electrochemical test system. To describe in more detail, the working electrode and the counter electrode are both soaked in a 3.5% NaCl solution, the reference electrode (i.e., the calomel electrode) is soaked in a KCl solution, and the foregoing three electrodes are all electrically connected to the potentiostat. In addition, there is a salt bridge that is soaked in the NaCl solution by one end thereof, and the another end of the salt bridge is soaked in the KCl solution. By such arrangement, it is able to measure polarization curves of the sample of the high chromium and silicon-rich corrosion resistant steel by operating the potentiostat. Consequently, the pitting potential of the sample is therefore obtained by using specific program to process the measured polarization curves.

As a result, related experimental data of 16 samples of the high chromium and silicon-rich corrosion resistant steel according to the present invention are integrated in following table (1).

TABLE (1)

| Samples | Elemental composition (wt %) | | | Hardness in as-homogenized state (HV) | Pitting potential (Volt) |
|---|---|---|---|---|---|
| | Fe | Cr | Si | | |
| A1 | 76 | 22 | 2 | 181 | 0.8 |
| A2 | 75 | 22 | 3 | 194 | 0.9 |
| A3 | 72 | 22 | 6 | 292 | 1.1 |
| A4 | 68 | 22 | 10 | 360 | 1.2 |
| A5 | 74.5 | 24 | 1.5 | 160 | 0.1 |
| A6 | 73 | 24 | 3 | 200 | 1.2 |
| A7 | 71.5 | 24 | 4.5 | 275 | 1.2 |
| A8 | 70 | 24 | 6 | 300 | 1.2 |
| A9 | 68 | 24 | 8 | 370 | 1.3 |
| A10 | 66 | 24 | 10 | 410 | 1.2 |
| A11 | 69 | 28 | 3 | 245 | 1.0 |
| A12 | 64 | 28 | 8 | 480 | 1.2 |
| A13 | 68 | 30 | 2 | 221 | 1.1 |
| A14 | 65 | 30 | 5 | 297 | 1.2 |
| A15 | 62 | 30 | 8 | 530 | 1.2 |
| A16 | 60 | 30 | 10 | 828 | 1.2 |

From the foregoing table (1), it is easy to find that, the 16 samples are all belonged to the first embodiment of the high chromium and silicon-rich corrosion resistant steel. Moreover, it is further found that, the samples containing 22-24 wt % Cr possess higher and higher hardness with the increase of Si content. In addition, experimental data of the table (1) also indicate that, the samples of the high chromium and silicon-rich corrosion resistant steel all have a hardness in a range between HV170 and HV500, except for the samples A15 and A16. It is worth mentioning that, there are cracks occurring around the brinelling that is made by a diamond indenter to form on the surface of the samples A15 and A16 during the hardness measurement, this means that the samples A15 and A16 having the hardness greater than HV 500 are easily subject to rupture and/or peel crack during plastic deformation, thereby being apparently unsuitable for applications in the manufacture of the structural articles. From the foregoing table (1), it is easy to find that, the 16 samples all have a pitting potential greater than 0.8V. It is worth mentioning that, there is localized pitting corrosion occurring on the surface of the sample A5 after its pitting potential measurement is completed. As a result, experimental data recorded in the table (1) have indicated that the Si content in the high chromium and silicon-rich corrosion resistant steel according to the present invention must be at least 2 wt %.

Second Experiment

In the second experiment, 19 samples of the high chromium and silicon-rich corrosion resistant steel according to the present invention are fabricated by vacuum arc melting process. The following table (2) lists each sample's elemental composition. Moreover, homogenization process, hardness measurement and pitting potential measurement for the 19 samples are also completed. As a result, related experimental data of 19 samples of the high chromium and silicon-rich corrosion resistant steel according to the present invention are integrated in following table (2).

TABLE 2

| Samples | Elemental composition (wt %) | | | | Hardness in as-homogenized state (HV) | Pitting potential (Volt) |
|---|---|---|---|---|---|---|
| | Fe | Cr | Si | minor element(s) | | |
| B1 | 70 | 24 | 4 | Ni: 2 | 270 | 1.2 |
| B2 | 70 | 24 | 4 | Ti: 2 | 363 | 1.2 |
| B3 | 70 | 24 | 4 | Cu: 2 | 289 | 1.1 |
| B4 | 71 | 24 | 3 | V: 1 Zr: 1 | 221 | 1.1 |
| B5 | 75 | 22 | 2 | Mo: 1 | 190 | 0.9 |
| B6 | 75 | 22 | 2 | Nb: 1 | 185 | 0.9 |
| B7 | 74 | 22 | 2 | Nb: 1 Ti: 1 | 193 | 0.9 |
| B8 | 70.5 | 22 | 6 | Al: 1.5 | 306 | 1.1 |
| C1 | 66 | 26 | 6 | Nb: 1 Mo: 1 | 334 | 1.2 |
| C2 | 67.8 | 26 | 6 | B: 0.2 | 284 | 1.2 |
| C3 | 67 | 26 | 4 | Nb: 1 Mo: 2 | 294 | 1.2 |
| C4 | 69 | 26 | 3 | Mn: 1 Co: 1 | 212 | 1.1 |
| D1 | 61.5 | 28 | 8 | Mo: 2.5 | 343 | 1.2 |
| D2 | 68.9 | 28 | 3 | C: 0.1 | 227 | 1.2 |
| D3 | 68.9 | 28 | 3 | B: 0.1 | 205 | 1.2 |
| D4 | 65 | 28 | 5 | Ta: 2 | 275 | 1.1 |
| E1 | 65.7 | 30 | 4 | C: 0.3 | 286 | 1.1 |
| E2 | 65.9 | 30 | 4 | C: 0.1 | 249 | 1.1 |
| E3 | 62 | 30 | 6 | Sn: 2 | 324 | 1.2 |

From the foregoing table (2), it is easy to find that, the 19 samples are all belonged to the second embodiment of the high chromium and silicon-rich corrosion resistant steel. It is worth mentioning that, there are no cracks occurring around the brinelling that is made by a diamond indenter to form on the surface of each of the 19 samples during the hardness measurement. Moreover, there is also no localized pitting corrosion occurring on the surface of each of the 19 samples after their pitting potential measurements are completed. As a result, experimental data recorded in the table (2) have proved that, the high chromium and silicon-rich corrosion resistant steel according to the present invention has a pitting potential greater than 0.8V and a hardness in a range between HV170 and HV500. Moreover, it is further found that, each of the 19 samples shows higher and higher hardness and pitting potential with the increase of Si content. In addition, experimental data of the table (2) also indicate that, although the addition of at least one minor element (e.g., B, C, Mo, Nb, Ni, Ti, Cu, V, Zr, Mn, Co, Ta, Sn, Al) would affect the hardness of the high chromium and silicon-rich corrosion resistant steel, the high chromium and silicon-rich corrosion resistant steel still has a pitting potential greater than or equal to 0.8V.

In consequence, experimental data recorded in the foregoing tables (1) and (2) have proved that, samples of the high chromium and silicon-rich corrosion resistant steel all have a pitting potential greater than 0.8V and a hardness in a range between HV170 and HV500 in the as-homogenized condition. As a result, experimental data have also proved that, the high chromium and silicon-rich corrosion resistant steel according to the present invention is developed for replacing conventional stainless steels having poor pitting resistance like type 304 and type 316 L, thereby being adopted for the applications of components and/or structural parts requiring high corrosion resistance.

Through above descriptions, all embodiments and related experimental data of the high chromium and silicon-rich corrosion resistant steel according to the present invention have been introduced completely and clearly. However, the embodiments are not intended to limit the scope of the present invention, and all equivalent implementations or alterations within the spirit of the present invention still fall within the scope of the present invention.

What is claimed is:

1. A high chromium and silicon-rich corrosion resistant steel for being applied in manufacturing an article that has a pitting potential greater than 0.8V in seawater and a hardness in a range between HV170 and HV500, and consisting of, in weight percent:
   24-28% Cr;
   2.5-3% Si;
   0.05-0.15% C;
   at most 0.2% B:
   less than or equal to 3% Mo;
   less than or equal to 2% M; and
   the balance Fe;
   wherein an amount of Cr and Si is in a range of 26.5-31%;
   wherein M comprises at least one additive element, and the additive element is selected from a group consisting of Ni, Ti, Cu, V, Zr, Mn, Co, Ta, Sn, and Al, and, a summation of Ni, Ti, Cu, V, Zr, Mn, Co, Ta, Sn, and Al content is less than or equal to 2%.

2. The high chromium and silicon-rich corrosion resistant steel of claim 1, being processed to be in an as-cast state, or being in a heat-treated state after being applied with a heat treatment that is selected from a group consisting of precipitation hardening treatment, annealing treatment, and homogenization treatment.

3. An article, being made of a high chromium and silicon-rich corrosion resistant steel having a pitting potential greater than 0.8V in seawater and a hardness in a range between HV170 and HV500; wherein the high chromium and silicon-rich corrosion resistant steel consists of, in weight percent:
   24-28% Cr;
   2.5-3% Si;
   0.05-0.15% C;
   at most 0.2% B;
   less than or equal to 3% Mo;
   less than or equal to 2% M; and
   the balance Fe;
   wherein an amount of Cr and Si is in a range of 26.5-31%;
   wherein M comprises at least one additive element, and the additive element is selected from a group consisting of Ni, Ti, Cu, V, Zr, Mn, Co, Ta, Sn, and Al, and, a summation of Ni, Ti, Cu, V, Zr, Mn, Co, Ta, Sn, and Al content is less than or equal to 2%.

* * * * *